United States Patent Office 2,964,409
Patented Dec. 13, 1960

2,964,409

PRODUCTION OF COMMINUTED MEAT PRODUCTS

Louis Sair, Evergreen Park, Ill., assignor to The Griffith Laboratories, Inc., Chicago, Ill., a corporation of Illinois No Drawing. Filed Jan. 26, 1959, Ser. No. 788,719

2 Claims. (Cl. 99—108)

The present invention relates to the production of comminuted meat products such as loaf, and encased and canned products. In particular, it relates to an agent imparting desirable viscosity to the meat mass and at the same time serving in processing to disperse the fat and hold it in dispersion, as a so-called emulsion.

Heretofore, finely divided meat which term includes lean and fat, ice, salt and seasoning, with or without curing salt and any additives related to curing, and dispersing agents, such as sodium caseinate, have been homogeneously comminuted and mixed to form the conventional meat emulsion in which fat is incorporated as a dispersion. The trade refers to the dispersing agents as emulsifiers and the product as emulsions, and such terms are used herein.

The present invention is based upon the discovery that calcium caseinate is a distinctive and superior agent to serve the purposes of sodium caseinate. The quality of product which may be achieved with a given quantity of sodium caseinate may be achieved with a less quantity of calcium caseinate.

The two caseinates each emulsify fat by forming protective coverings around the fat particles produced in the processing. The two caseinates are hydrophilic and in the aqueous meat mass, they variously provide an aqueous phase in which the dispersed or emulsified fat particles are distributed, and the aqueous phase has an inherent viscosity which is reflected in the stiffness or solidity of the chilled meat mass, especially in encased products.

Having discovered that superior results are obtained using calcium caseinate in place of sodium caseinate, the two caseinates were compared to ascertain the reasons for differences in behavior.

First, the viscosity in water was studied, and it was found that sodium caseinate forms a translucent viscous solution at 10% concentration in water, while calcium caseinate forms a chalk-like suspension in water at a lower viscosity. Secondly, because the aqueous phase of processed meat products is approximately a 5% solution of sodium chloride, the behavior in such a salt solution was determined. A marked difference was found. Thirdly, because the previous two comparisons were not carried out at the pH of comminuted meat, the behavior in 5% salt solution at the pH of the meat was studied, and this seemingly explains the found superiority. In each case, three different sources of the two casein salts were employed. Sodium caseinate is a staple article of commerce. Two commercial sources of it were employed, designated herein A and B. A third form C was made from fluid (skim) milk by precipitating the casein with hydrochloric acid and washing the curd, followed by adding sodium hydroxide to effect a pH of 6.9 prior to drying.

The calcium caseinate employed was formed by adding calcium hydroxide to an aqueous suspension of casein made from fluid skim milk to produce a form D, and to aqueous suspensions of commercial caseins from two sources to produce forms E and F. A final pH in the vicinity of 7, preferably in the range from 7.0 to 7.3 is attained. Then, the solids content is dried, as by spray drying.

A typical analysis of calcium caseinate is as follows:

| | |
|---|---|
| Protein (N×6.38) percent | 92.4 |
| Ash do | 4.3 |
| Calcium do | 1.46 |
| Moisture do | 3.0 |
| pH (5% solution in water) | 7.1 |
| Taste | Bland |
| Color | White |

When the 5% salt solution was changed to the pH of meat, lactic acid was added, this being the principal acid imparting to meat a pH in the range from 5.7 to 6.1. The sodium caseinates have a pH in the range from 6.8 to 7.3, and in making calcium caseinates a pH in this range was attained.

The solutions compared were made in fixed proportions of 20 grams of the caseinate and 180 ml. of the aqueous liquid, using a Waring blender under carefully regulated uniform mixing conditions. The aqueous liquids were (1) water, (2) 5% sodium chloride solution by weight in water, and (3) the solution (2) including lactic acid to yield pH of 6 in the final dispersion.

The freshly made protein dispersions were allowed to stand over night at room temperature, and then the viscosities were determined by a Brookfield Viscosimeter with a fixed procedure (i.e. selected spindle and speed), and are reported below in centipoises.

*Table I (Water)*

| Caseinate | pH | Viscosity | Character |
|---|---|---|---|
| A | 7.0 | 32 | Translucent gel. |
| B | 7.0 | 32 | Do. |
| C | 6.9 | 24 | Do. |
| D | 6.9 | 18 | Non-Settling Milky Suspension. |
| E | 7.2 | 21 | |
| F | 7.3 | 16 | |

*Table II (5% NaCl solution)*

| Caseinate | pH | Viscosity | Character |
|---|---|---|---|
| A | 6.75 | 98 | Translucent gel. |
| B | 6.70 | 116 | Do. |
| C | 6.75 | 62 | Do. |
| D | 7.0 | | A phase separation: Upper half, a heavy aqueous gluelike liquid. Lower half, translucent very fluid liquid. |
| E | 7.3 | | |
| F | 7.3 | | |

*Table III (Acid 5% NaCl solution)*

| Caseinate | pH | Viscosity | Character |
|---|---|---|---|
| A | 5.7 | 58 | Translucent gel. |
| B | 5.8 | 58 | Do. |
| C | 5.7 | 38 | Do. |
| D | 5.9 | 124 | Smooth Translucent Gluey Paste. |
| E | 5.95 | 323 | |
| F | 5.95 | 552 | |

The solution comparable to the acidic aqueous phase in a meat emulsion of the type used in sausage, is highly viscous for calcium caseinate compared to that for sodium caseinate. The 5% sodium chloride solution of Table II shows distinctive behavior differences. In the case of sodium caseinate, sodium chloride increases the viscosity over that in water, but part of that increase does not materialize when the pH is such as is encountered in meat. Table III shows that calcium caseinate becomes far more viscous than sodium caseinate under the conditions prevailing in meat emulsions. The increased viscosity explains the superior emulsifying qualities and leads to more solid products.

In use for sausage emulsion, the two caseinates have been compared with a test formulation as follows:

Table IV (Frankfurter)

| | |
|---|---|
| Trimmed steer flanks _____ lbs __ | 100 |
| Chopped ice _____ lbs __ | 40 |
| Sodium chloride _____ ozs __ | 40 |
| Curing salt PP _____ ozs __ | 6 |
| Nacl _____ percent __ | 90 |
| $NaNO_2$ _____ do ____ | 6 |
| $NaNO_3$ _____ do ____ | 4 |
| Seasoning _____ ozs __ | 12 |
| Sodium ascorbate _____ oz __ | 0.75 |
| ————— Caseinate _____ | X |

After the conventional processing to emulsion, the masses were stuffed into casings and smoked by the following schedule:

Table V 60 minutes at 140° F.
30 minutes at 150° F.
20 minutes at 160° F.
110 minutes to reach internally 148° F.

The smoked frankfurters were then cooked in water for 3 minutes at 160° F. to attain an internal temperature of 152° F., drained, chilled in cold water to 120° F., maintained at normal room temperature (70° F. to 75° F.) for 30 minutes, and then placed in a coler at 40° F. for over-night. Then visual observations were made. "Fat cap" means visual fat at end of the casing.

Table VI

| Value X in Table IV | Observation |
|---|---|
| Zero (Control) _____ | Much fat and water separation. |
| 4 lbs. Sodium Caseinate _____ | Half the amount of fat separation found in the control. |
| 4 lbs. Calcium Caseinate _____ | Slight fat cap. |
| 5 lbs. Sodium Caseinate _____ | Comparable to the frankfurters made with 4 lbs. of Calcium Caseinate showing slight fat cap. |
| 5 lbs. Calcium Caseinate _____ | No fat cap, the frankfurters being superior to the product with Sodium Caseinate. |

The test formula has more fat than is conventionally used in commercial formulations, in order to make the test more severe to emphasize the differences.

A meat formulation was employed as follows:

Table VII

| | |
|---|---|
| Beef clods _____ lbs __ | 40 |
| Pork back fat _____ lbs __ | 55 |
| Chopped ice _____ lbs __ | 60 |
| Sodium chloride _____ ozs __ | 44 |
| Curing salt PP _____ ozs __ | 6 |
| Seasoning _____ ozs __ | 12 |
| Sodium ascorbate _____ oz __ | .75 |
| ————— Caseinate _____ | X |

Encased products were processed as given above under Table V, and the results are shown below:

Table VIII

| Value of X in Table VII | Observation |
|---|---|
| Control (X=0) _____ | Much fat cap, the frankfurters being soft. |
| 5 lbs. Sodium Caseinate _____ | Slightly less fat cap than control, the frankfurters being firmer. |
| 5 lbs. Calcium Caseinate _____ | Trace of fat cap, with very firm frankfurters. By far the superior product. |

When only calcium caseinate is used as the fat-emulsifier, it may be present in quantity upwardly from 0.5 part by weight per 100 parts of meat including lean and fat, but preferably in the range from 1 to 8 parts, the excess over 8 being inefficiently used. It is, of course, to be understood that mixtures of sodium caseinate and calcium caseinate may be employed. Other fat-emulsifiers are used alone. Examples are gums, such as gum Karaya and gum tragacanth, alginates, milk solids, flours, such as wheat, corn and soy, and others permitted in edible products. Since other emulsifiers function for the same objectives but in different degrees, it is to be understood that the present invention contemplates the use of calcium caseinate as a component of a mixture of emulsifiers, in amount upwardly from zero to 8 parts per 100 parts of meat, the maximum being contemplated when no other emulsifier is added. When used with others, and in particular, with sodium caseinate, its contribution is present but not readily measurable.

The protein of meat, which is myosin, is an excellent emulsifier, but in certain meat formulations additives, such as calcium caseinate, supplement the emulsifying qualities of the meat protein.

As the term fat-emulsifier is used herein, it designates the additive ones and ignores the natural ones.

It is to be understood that the invention is applicable to many compositions involving comminuted meat, as set forth in the appended claims.

I claim:

1. The method of making comminuted meat products containing sodium chloride comprising incorporating therein fat-emulsifier comprising calcium caseinate in amount from 0.5 to 8 parts per 100 parts of meat, said calcium caseinate being the product of neutralization to a pH in the vicinity of 7 by calcium hydroxide of casein derived from milk.

2. The method of making comminuted meat products containing sodium chloride comprising incorporating therein fat-emulsifier consisting of calcium caseinate in amount from 0.5 to 8 parts per 100 parts of meat, said calcium caseinate being the product of neutralization to a pH in the vicinity of 7 by calcium hydroxide of casein derived from milk.

References Cited in the file of this patent

UNITED STATES PATENTS

| | | |
|---|---|---|
| 2,060,160 | Allen _____ | Nov. 10, 1936 |
| 2,355,548 | Musher _____ | Aug. 8, 1944 |
| 2,521,579 | Hopkins et al. _____ | Sept. 5, 1950 |
| 2,634,211 | Komarik _____ | Apr. 7, 1953 |
| 2,635,963 | Glabe _____ | Apr. 21, 1953 |

OTHER REFERENCES

"Milk and Milk Processing," 1948, first edition, B. L. Herrington, publ. by McGraw-Hill Book Co. Inc., New York, page 70, article entitled Some Properties of Casein.